(12) United States Patent (10) Patent No.: US 7,885,870 B2
Nam et al. (45) Date of Patent: Feb. 8, 2011

(54) SYSTEM FOR PROVIDING BANKING SERVICES BY USE OF MOBILE COMMUNICATION

(75) Inventors: Deok-Young Nam, Seoul (KR); Hyung-Seok Kim, Gyunggi-do (KR); Jun-Hyung Kim, Kyeongki-do (KR); Hee-Jin Park, Seoul (KR)

(73) Assignee: LG Uplus Corp., Seoul (KR)

( * ) Notice: Subject to any disclaimer, the term of this patent is extended or adjusted under 35 U.S.C. 154(b) by 1255 days.

(21) Appl. No.: 10/872,448

(22) Filed: Jun. 22, 2004

(65) Prior Publication Data

US 2004/0267665 A1 Dec. 30, 2004

(30) Foreign Application Priority Data

| Jun. 24, 2003 | (KR) | 10-2003-0041140 |
| Jun. 24, 2003 | (KR) | 10-2003-0041141 |
| Jun. 24, 2003 | (KR) | 10-2003-0041142 |
| Jun. 24, 2003 | (KR) | 10-2003-0041143 |
| Jun. 24, 2003 | (KR) | 10-2003-0041144 |

(51) Int. Cl.
*G06Q 40/10* (2006.01)
(52) U.S. Cl. .......................................... 705/35; 705/40
(58) Field of Classification Search ................ 705/35, 705/40
See application file for complete search history.

(56) References Cited

U.S. PATENT DOCUMENTS

| 6,134,661 | A  | * | 10/2000 | Topp ............................. 726/18 |
| 6,169,890 | B1 | * | 1/2001 | Vatanen ........................ 455/406 |
| 6,674,477 | B1 | * | 1/2004 | Yamaguchi et al. ......... 348/387.1 |
| 6,859,650 | B1 | * | 2/2005 | Ritter ........................... 455/406 |

(Continued)

OTHER PUBLICATIONS

No Author, Cyber Banking Reaches New Levels Sophistication; FCIS Group Launches Latest Generation, Business Wire, New York, Mar. 23, 1998 p. 1.*

*Primary Examiner*—James P. Trammell
*Assistant Examiner*—Abdul Basit
(74) *Attorney, Agent, or Firm*—Young & Thompson

(57) ABSTRACT

A system for providing banking services by use of a mobile communication system, in which a variety of financial transactions including inquiry of at least one financial account of at least one financial institution, transfer and remittance, and loan and its interest payment are processed by the mobile communication system. The system includes: the mobile communication system, provided with an integrated circuit (IC) card and a memory device to which a banking application is installed, for transmitting and receiving data by wireless, the IC card being stored with information on a personal identification number (PIN) and information related to financial accounts including a loan account. The banking application processing the financial transactions including the financial account inquiry, the transfer and remittance, and the loan and its interest payment by mobile banking; a base station transceiver system (BTS) for executing a wireless interface with the mobile communication system and a base station controller (BSC) for performing call processing and for providing a core network interface with the BTS. A packet data switching network (PDSN) for providing a packet data transfer service using a transmission control protocol/Internet protocol (TCP/IP); and at least one banking server for, when being requested to process the financial transactions including the financial transactions including the financial account inquiry, the transfer and remittance, and the loan and its interest payment by the banking application of the mobile communication system.

20 Claims, 7 Drawing Sheets

U.S. PATENT DOCUMENTS

| | | | |
|---|---|---|---|
| 6,901,436 B1 * | 5/2005 | Schneider | 709/219 |
| 7,114,175 B2 * | 9/2006 | Lahteenmaki | 726/4 |
| 7,210,620 B2 * | 5/2007 | Jones | 235/380 |
| 7,231,372 B1 * | 6/2007 | Prange et al. | 705/67 |
| 7,266,130 B2 * | 9/2007 | Lee et al. | 370/466 |
| 7,395,088 B2 * | 7/2008 | Shinzaki | 455/556.1 |
| 2002/0034301 A1 * | 3/2002 | Andersson | 380/270 |
| 2002/0111918 A1 * | 8/2002 | Hoshino et al. | 705/65 |
| 2003/0008637 A1 * | 1/2003 | Vatanen | 455/410 |
| 2003/0194090 A1 * | 10/2003 | Tachikawa | 380/270 |

* cited by examiner

SYSTEM FOR PROVIDING BANKING SERVICES BY USE OF MOBILE COMMUNICATION

BACKGROUND OF THE INVENTION

1. Field of the Invention

The present invention relates to a system for providing banking services by use of a mobile communication system, more particularly, in which the mobile communication system is provided with a removable integrated circuit (IC) card chip in which personal identification number (PIN) information, financial account information, etc. are stored, and a banking application for financial transactions which is driven on a Java Virtual Machine and mobile banking such as mobile account inquiry, transfer/remittance, loan/payment and so forth are used, thereby maximizing convenience of a user with regard to the mobile banking, and simultaneously minimizing network loads of a communication network and reinforcing security against data and financial information.

2. Description of the Related Art

Currently, as mobile communication systems become enhanced in their performance together with communication networks, there are provided a variety of mobile banking services by use of the mobile communication systems such as mobile phones, personal digital assistants (PDAs) or so forth. In particular, such mobile banking services make it possible for any customer to conveniently use banking services, such as account inquiry, transfer/remittance and payment, and inquiry and payment of a loan, anytime and anywhere without directly visiting their correspondent banks.

Generally, conventional mobile banking services, for example a mobile account inquiry, mobile transfer/remittance, and mobile loan overview inquiry/loan interest payment have employed a wireless Internet system on the basis of WAP (wireless application protocol). Specifically, the conventional mobile banking services allow any Internet banking user to activate a WAP browser of a terminal (e.g. personal computer), to have access to a URL (uniform resource locator) of the corresponding banking server, to input his/her own ID (identification) and password for authentication, and after authentication, to banking services such as account inquiry, transfer/remittance, and inquiry of a loan account overview and payment of its interest and so on.

These conventional mobile banking services merely change Internet banking services over a wired Internet into that over the wireless Internet based on the WAP. Because the mobile communication systems fail to provide a large size screen, easy input procedure and storage capability like the personal computer, there is much inconvenience in use.

Further, whenever using his/her desired banking service, the customer must input various kinds of information, such as ID, password, account number and so forth, through the mobile communication system. Thus, the customer has trouble to use the banking service. Further, because of weak security of the mobile communication system, it is next to impossible to store data related to personal information in the memory of the mobile communication system and to use the data.

In addition, once the mobile communication system has access to the banking server, a series of processes, for example inputting the account number, performing customer authentication, inquiring of a transaction history, inquiring of the loan account overview, paying interest on a loan and so forth, are performed during the session. Hence, there are problems in that the user or customer is weighted with the charge for a phone call etc., and that loads of the communication network is weighted.

SUMMARY OF THE INVENTION

To solve the above-indicated problems, it is, therefore, an aspect of the present invention to provide a method for providing banking services by use of a mobile communication system, capable of, during using mobile banking such as a mobile account inquiry service, a mobile transfer/remittance service, a mobile loan overview inquiry and loan interest payment service and so forth, simplifying complicated inputting of a user.

It is another aspect of the present invention to provide a system for providing banking services by use of a mobile communication system, capable of, during using mobile banking services, reducing an access time between a mobile communication system and a banking server and minimizing network loads of a communication network It is yet another aspect of the present invention to provide a system for providing banking services by use of a mobile communication system, capable of, during using mobile banking services, reinforcing security against data and financial information.

To achieve these above-noted aspects, according the present invention, there is provide a system for providing banking services by use of a mobile communication system, in which a variety of financial transactions of at least one financial account of at least one financial institution are processed by the mobile communication system, the system comprising: the mobile communication system, provided with an integrated circuit (IC) card and a memory device to which a banking application is installed, for transmitting and receiving data by wireless, the IC card being stored with information on a personal identification number (PIN) and information related to financial accounts, the banking application processing the financial transactions by mobile banking; a base station transceiver system (BTS) for executing a wireless interface with the mobile communication system and a base station controller (BSC) for performing call processing and for providing a core network interface with the BTS; a packet data switching network (PDSN) for providing a packet data transfer service using a transmission control protocol/Internet protocol (TCP/IP); and at least one banking server for, when being requested to process the financial transactions by the banking application of the mobile communication system, providing information processing the request and information on a response to the request, wherein, when a key signal related to the financial transactions is inputted in the mobile communication system, the banking application installed to the mobile communication system is executed, the PIN information for completing a login to the IC card is inputted, authentication is performed in the mobile communication system, a list of the financial accounts stored in the IC card is extracted and displayed in a display window of the mobile communication system, any one of financial accounts is selected from the list of the financial accounts, a request message of the financial transactions is formed using various kinds of information on the selected financial account and transmitted to the banking server, the banking server processes the financial transactions in response to the financial transaction request message and transmits a result of processing the financial transactions to the mobile communication system, and the result of processing the financial transactions is displayed through the display window of the mobile communication system.

Further, the mobile communication system is provided with a dedicated key for performing only the financial transactions. Preferably, the mobile communication system is any one of a mobile phone, a smart phone and a personal digital assistant (PDA) which have a communication function. A hierarchical structure of software (S/W) built in the mobile communication system has an IC card driver for managing data of the IC card and system S/W for managing basic functions of the mobile communication system, which are established as a lower structure, and the banking application and an IC card application programming interface (IC card API), which are established as an upper structure, and a Java virtual machine (Java VM) as an intermediate code for executing the banking application between the lower and upper structures.

Further, the IC card is removable and attachable from/to the mobile communication system, and performs any one of modification of the information related to the financial accounts stored in the IC card, and addition of new information on the financial accounts, after permitting the login through authentication of the PIN information.

Preferably, the IC card stores the financial account information including an account number and password, a corresponding financial institution code, a kind of the account, and customer information with regard to each financial account of a user, and also has a function for resetting the financial account information so as to allow the financial account information stored in the IC card and that managed by the banking server to be matched with each other.

Meanwhile, the PIN information stored in the IC card is inputted by providing a short message service to the mobile communication system of the user with which the IC card is equipped, and by manipulating the IC card.

And, the mobile communication system and the banking server make use of any one of encryption solutions including E2E (end to end) and WPKI (wireless public key infrastructure) for security of data and financial information.

BRIEF DESCRIPTION OF THE DRAWINGS

The above aspects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described below in detail with reference to the accompanying drawings.

Figure 1:
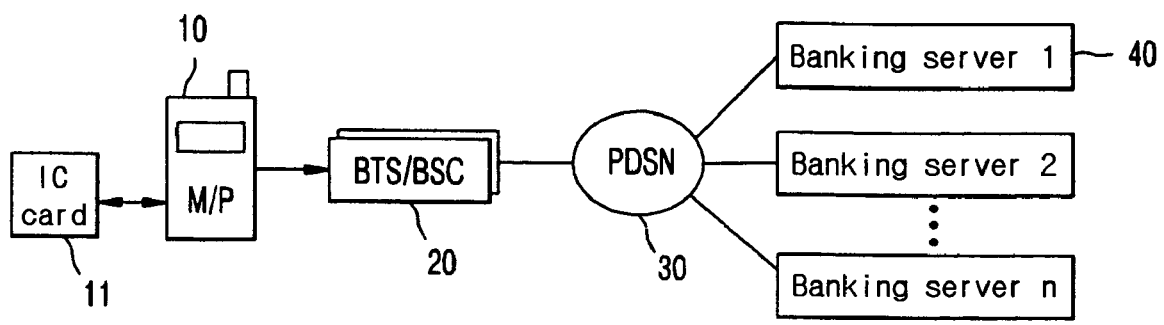
FIG. 1 illustrates a schematic configuration of a system for providing banking services by use of a mobile communication system according to the present invention.

FIG. 1 illustrates a schematic configuration of a mobile banking system according to the present invention.

Referring to FIG. 1, a mobile banking system of the present invention is generally composed of a mobile communication system 10 of a user or customer, a base station transceiver system (BTS)/base station controller (BSC) 20—for supporting wireless communication of the mobile communication system 10, a packet data switching network (PDSN) 30, and banking servers 40 installed at each financial institution.

The PDSN 30 provides a packet data transfer service using a PPP (point-to-point protocol) and a TCP/IP (transmission control protocol/Internet protocol) between a RAN (Radio Access Network) and a DCN (Data Core Network), wherein the RAN is composed of the BTS which performs a wireless interface with the mobile communication system 10, the BSC 20 which perform call processing and provides a core network interface with the BTS, and so forth. The banking services of the present invention are provided on the basis of the TCP/IP.

Each banking server 40 is provided equipment for each financial institution so as to interact with the mobile system including the mobile communication system 10, the BTS/BSC 20 and the PDSN 30. Further, the banking server 40 receives various request messages, such as an account inquiry request message, a request message related to transfer/remittance, a request message related to loan overview inquiry/loan interest payment, etc., which are transmitted from the mobile communication system 10 through the PDSN 30, performs a predetermined customer authentication process, processes the received messages in interaction with its host server, and transmits the processed results and their related data to the mobile communication system 10 through the PDSN 30 and the BTS/BSC 20.

In this manner, the mobile communication system 10 and the banking server 40 has access to each other using the TCP/IP. Various kinds of data or information are transmitted and received between the mobile communication system 10 and the banking server 40 by means of wireless TCP/IP communication using a wireless data network.

Meanwhile, the mobile communication system 10 includes a mobile or cellular phone, a smart phone, a personal digital assistant (PDA) and so on, each of which is provided with all hardware for wireless data communication. The mobile communication system 10 is equipped with a removable IC card 11 and a memory device mounting all software (S/W) for mobile banking services such as account inquiry, transfer/remittance, loan overview inquiry and loan interest payment, and so on.

The IC card 11 can be removed from and mounted to the mobile communication system 10 and has various kinds of stored information, such as personal identification number (PIN) information, financial account information of the user or other persons, customer information and so on. The user can have access to the stored information by PIN authentication, wherein the PIN authentication is performed by inputting information on a password of the IC card 11, namely the PIN information, and by checking whether the inputted PIN information is matched with stored PIN information or not. Further, various kinds of information related to each financial account and each loan account, for example the account number and password, the code of the corresponding financial institution, the kind of the account (e.g., an ordinary deposit account, a savings account, an installment savings deposit account, a loan account for housing etc.) and so forth, are matched and stored in the IC card 11.

The stored information of the IC card 11 is set when the IC card 11 is issued at a financial institution window such as a bank window. The user can complete a login to the IC card 11 through the PIN authentication which is allowed to check whether the PIN information stored in the IC card 11 is matched with that inputted through the mobile communication system 10 or not, and then is capable of modifying and adding the financial account information (the account number, the password, etc.) through the mobile communication system 10.

Further, the IC card 11 has a function for resetting the account information so as to allow the account information stored in the IC card 11 and that managed by the banking server 40 to be matched with each other. Preferably, this resetting of the account information is done by a reset key button provided on the mobile communication system 10.

In addition, when the user applies for the IC card 11 through a postal service without visiting the financial institution window in person, the financial institution sends the IC card 11 to the user in a state incapable of setting the PIN information. At the point of time when the user informs the financial institution that he/her has received the IC card 11, the financial institution sends a short message service (SMS) message to the user's mobile communication system 10 with which the IC card 11 is equipped, and then the user manipulates the IC card 11 in a state capable of setting the PIN information. Thereby, it is possible to previously prevent misuse of the IC card 11, which is responsible for loss or theft of the IC card 11 while the IC card 11 is sent. Thus, the user is able to have the IC card issued without directly visiting the financial institution. In other words, a short message of the SMS includes a control message for setting the PIN information, and is forwarded to the mobile communication system 10. The control message, which is forwarded to the mobile communication system 10, invokes an IC card API (application programming interface) which is built in the mobile communication system 10 (see FIG. 2). Then, Java Virtual Machine (Java VM) transmits data of the IC card API to an IC card driver through system S/W together with the control message. Next, the control message is manipulated at the IC card 11, thus making it possible to set the PIN information.

Further, in the IC card 11, some of financial accounts of the user himself/herself or any other person can be registered and managed by selection of the user as "favorite deposit accounts" together with information on their depositors in order to facilitate transferring/remitting money.

The IC card 11 not only permits access to its stored information only through the PIN authentication, but it can be also attached and used to the mobile communication system 10 if necessary, and can be separately kept if not used. Thus, it is possible not only to provide convenience of the user when the user inputs information related to the financial accounts but also to ensure security of the inputted information.

Moreover, the mobile communication system 10 and the banking server 40 may fundamentally make use of an encryption solution such as E2E (end to end), WPKI (wireless public key infrastructure) etc. for security of data and financial information under the mobile environment.

Figure 2:
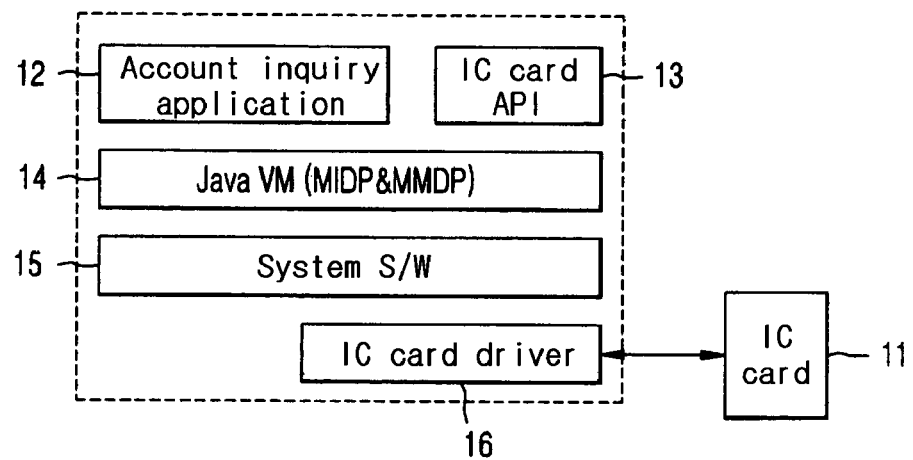
FIG. 2 illustrates a hierarchical structure, or configuration, of software (S/W) of a mobile communication system according to the present invention.

FIG. 2 illustrates a hierarchical structure, or a configuration, of software (SiW) mounted on a memory device of the mobile communication system 10.

Referring to FIG. 2, a configuration of software (S/W) mounted on a memory device of the mobile communication system 10 has an IC card driver 16 and system S/W 15, which are established as a lower structure, a Java VM (MIDP & MMDP) 14, and a banking application 12 and an IC card API 13, which are established as an upper structure, wherein the IC card driver 16 is for managing data of the IC card 11, and the system S/W 15 is for managing basic functions of the mobile communication system 10.

The banking application 12 is a process S/W program for executing mobile banking transactions such as account inquiry, transfer/remittance of funds, loan/paymnent, and so forth.

The Java VM 14 is an intermediate code defined so as to allow the (mobile) banking application 12 to be executed by a virtual machine regardless of an operation system (O/S) or a platform.

The banking application 12, as an S/W program having a series of processes for the mobile account inquiry, receives data and selection instructions through the mobile communication system 10 or outputs a result of the account inquiry etc., and transmits/receives data to/from the IC card 11 and the banking server 40.

The banking application 12 and the IC card API 13 can perform upgrading independently of the lower structure by use of the functions of the Java VM 14, and can perform both downloading and upgrading of S/W through a wireless network.

Meanwhile, a brief description will be made below regarding a process of having access to the IC card 11 at the banking application 12.

In the present invention, in order to read out the PIN information and financial account information stored in the IC card 11, the IC card API 13 is invoked at the banking application 12, and the Java VM 14 transmits the read instructions of the corresponding information to the IC card driver 16 though the system S/W 15 on the basis of the data of the IC card API 13. Thereby, the IC card driver 16 drives the IC card 11 to read out the corresponding information.

Furthermore, the banking application 12 processes the information which is read out from the IC card 11, displays it in a display window of the mobile communication system 10, and requests the banking server 40 to transmit information caused by the mobile banking services such as the mobile account inquiry, the mobile transfer/remittance of funds, and the mobile loan account inquiry and loan interest payment.

Hereinafter, each embodiment of the present invention will be described with reference to the drawings, wherein each embodiment relates to the mobile banking services such as the account inquiry, the transfer/remittance, the loan account inquiry and payment of the loan interest and so forth.

In each embodiment that will be set forth below, the banking application 12 has different terms according to each banking service. For example, the banking application 12 may be classified into an account inquiry application, a transfer/remittance application and a loan/payment application, which are all given the same reference number.

First Embodiment

Figure 3:
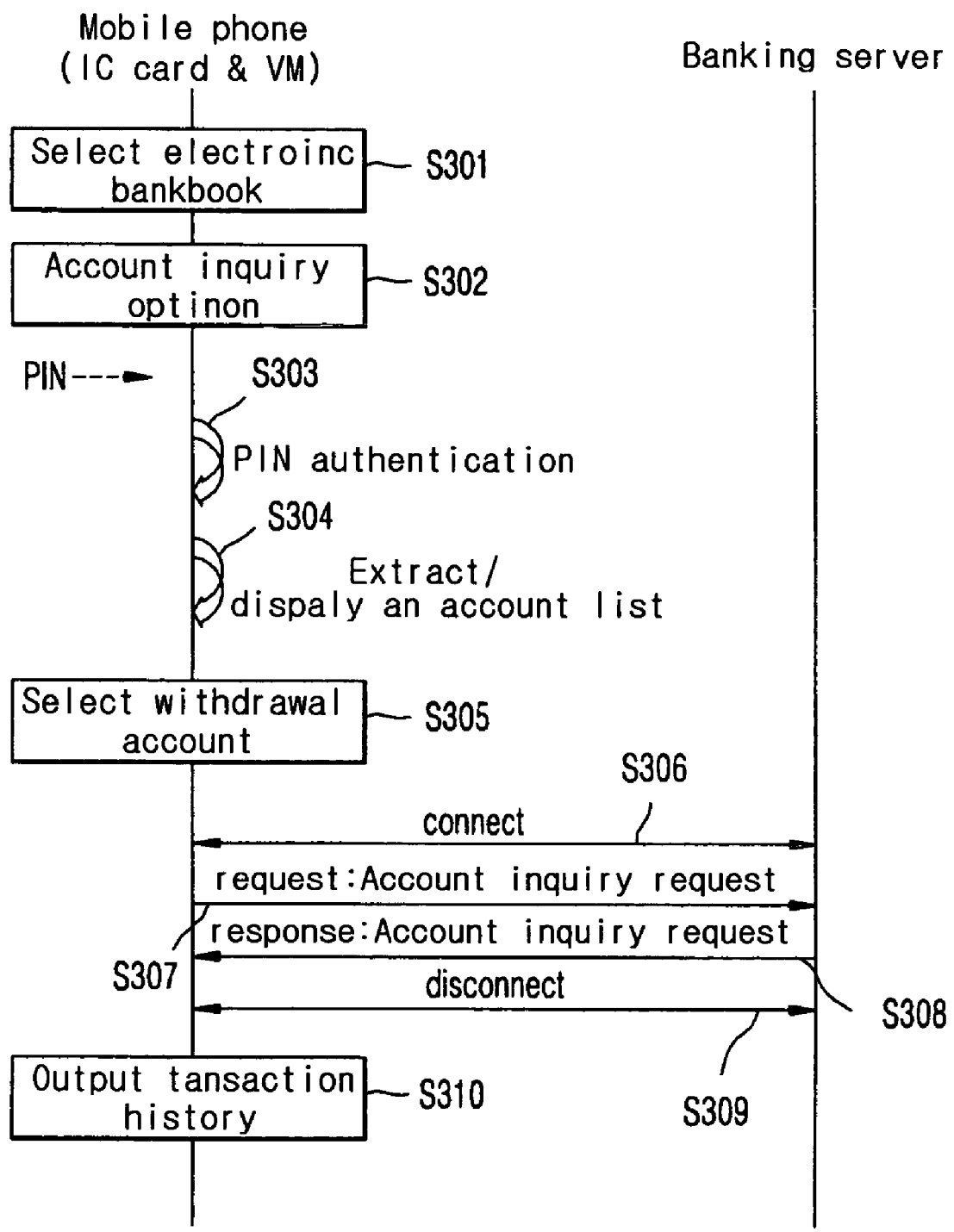
FIG. 3 is a flow diagram showing a financial account inquiry service according to a first embodiment of the present invention.

FIG. 3 is a flow diagram showing a mobile account inquiry service according to a first embodiment of the present invention, in which a process of providing the mobile account inquiry service by interaction between the IC card 11 and the mobile communication system 10 and the banking server 40 is illustrated.

Figure 4:
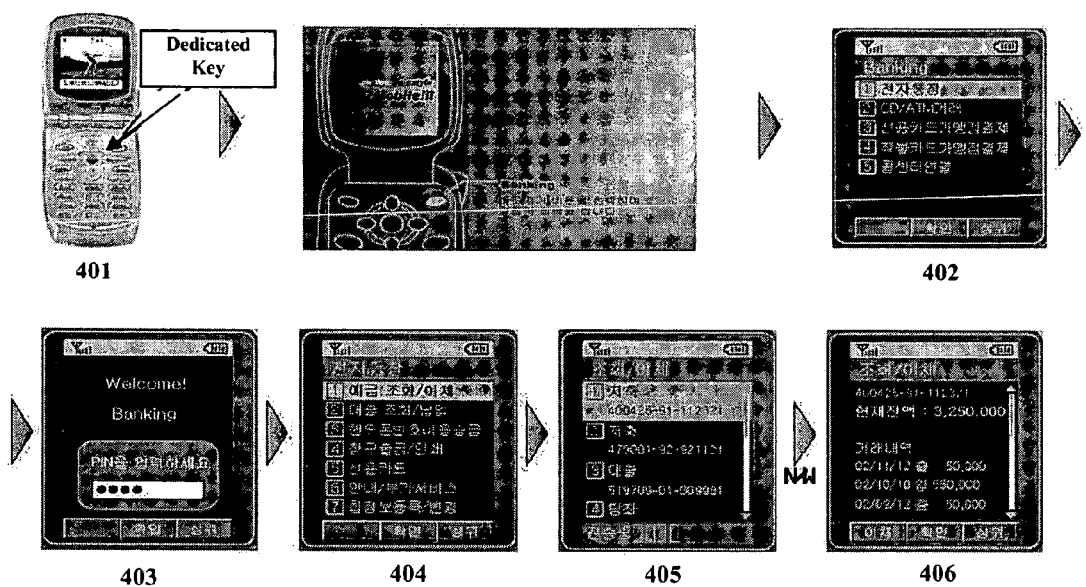
FIG. 4 illustrates a user interface according to a financial account inquiry service of the present invention.

Referring to FIG. 3, in order to use the mobile account inquiry service according to the first embodiment, an electronic bankbook service is selected through an mobile banking (M/B) dedicated key or a menu item that is installed on the mobile communication system 10 as illustrated in FIG. 4 (S301). Then, among the options of the electronic bankbook service, any one, namely an account inquiry service is selected (S302).

When the account inquiry service is selected from the options of the electronic bankbook service, the banking application or account inquiry application 12 activates an input screen of the PIN information in the display window of the mobile communication system 10 in response to an input signal of the key. Then, when the PIN information is inputted by a user, the account inquiry application 12 has access to the IC card 11, reads out the PIN information which has been stored in the IC card 11, and performs PIN authentication by a comparison of the inputted PIN information with the read-out PIN information (S303).

When the password of the IC card 11, i.e., the PIN information, inputted through the mobile communication system 10 is matched with the PIN information stored in the IC card and then a login is completed to the IC card 11, the account inquiry application 12 outputs financial accounts of the user stored in the IC card 11 to the display window of the mobile communication system 10. Thereby, the user checks the kinds of financial accounts and has a list of all general financial accounts outputted to the display window, excluding loan accounts (S304).

Then, the user selects one financial account intended for inquiry from the financial account list outputted to the display window of the mobile communication system 10 and requests the account inquiry (S305). In response to this request, the account inquiry application 12 verifies information on the financial account selected by the user (i.e., account number and password, financial institution code, customer information, etc.) by the IC card 11, and constructs an account inquiry request message including the verified information.

The mobile communication system 10 has socket access to the banking server 40 through the BTS/BSC 20 and the PDSN 30 to establish a data transmission line (S306), and forwards the constructed account inquiry request message to request information on a late transaction history of the selected financial account (S307). In this case, the mobile communication system 10 may do so after receiving start and end dates for the account inquiry from the user.

Thus, the banking server 40 carries out the authentication procedure through the selected financial account information such as the account number and password, the financial institution code, the customer information, etc., which are transmitted from the mobile communication system 10. When the authentication of the financial account is completed, the banking server 40 extracts the transaction history information within a recent or designated inquiry time period from a host server, constructs a transaction history response message including the extracted transaction history information, and transmits the constructed transaction history response message to the corresponding mobile communication system 10 (S308).

When the mobile communication system 10 normally receives the transaction history information on the financial account inquiry through the above-mentioned processes, the data transmission line between the mobile communication system 10 and the banking server 40 is released (S309), and the account inquiry application 12 outputs information on date-specific transaction history, balance, etc., of the financial account to the display window of the mobile communication system 10 (S310).

As set forth above, in the present invention, the account number and password, the customer information, etc., are processed by option selection and automatic input without separately inputting them, so that it is possible to afford convenience to the user. Further, the mobile communication system carries out a series of processes such as selection of the financial account in advance, has access to the banking server, and proceeds the account inquiry process, so that it is possible to reduce the time for having access to the banking server and network loads of the communication network.

FIG. 4 sequentially illustrates interface screens, each of which is displayed in the display window of the mobile communication system 10 of the user by driving of the account inquiry application 12, according to the first embodiment.

Referring to FIG. 4, in order to carry out the banking services, the user presses the M/B dedicated key installed on the mobile communication system 10 to activate the electronic bankbook service 401, and then selects the account inquiry service (inquiry/transfer of funds on deposit) among the options of the electronic bankbook service 402.

The display window of the mobile communication system 10 allows the input screen of the PIN information for launching the account inquiry service to be displayed 403. Then the authentication procedure of the PIN information inputted through the mobile communication system 10 is performed. After the authentication is completed, the list of the financial accounts of the user stored in the IC card 11 is accessed, extracted and displayed 404.

When the user selects any financial account intended for inquiry from the list of the financial accounts displayed in the display window of the mobile communication system 10 and requests an inquiry, the mobile communication system 10 constructs the inquiry request message using the information related to the selected financial account, and transmits the constructed inquiry request message 405 to the banking server 40. The mobile communication system 10 receives data derived from the inquiry, and displays the transaction history by date 406.

Second Embodiment

Figure 5:
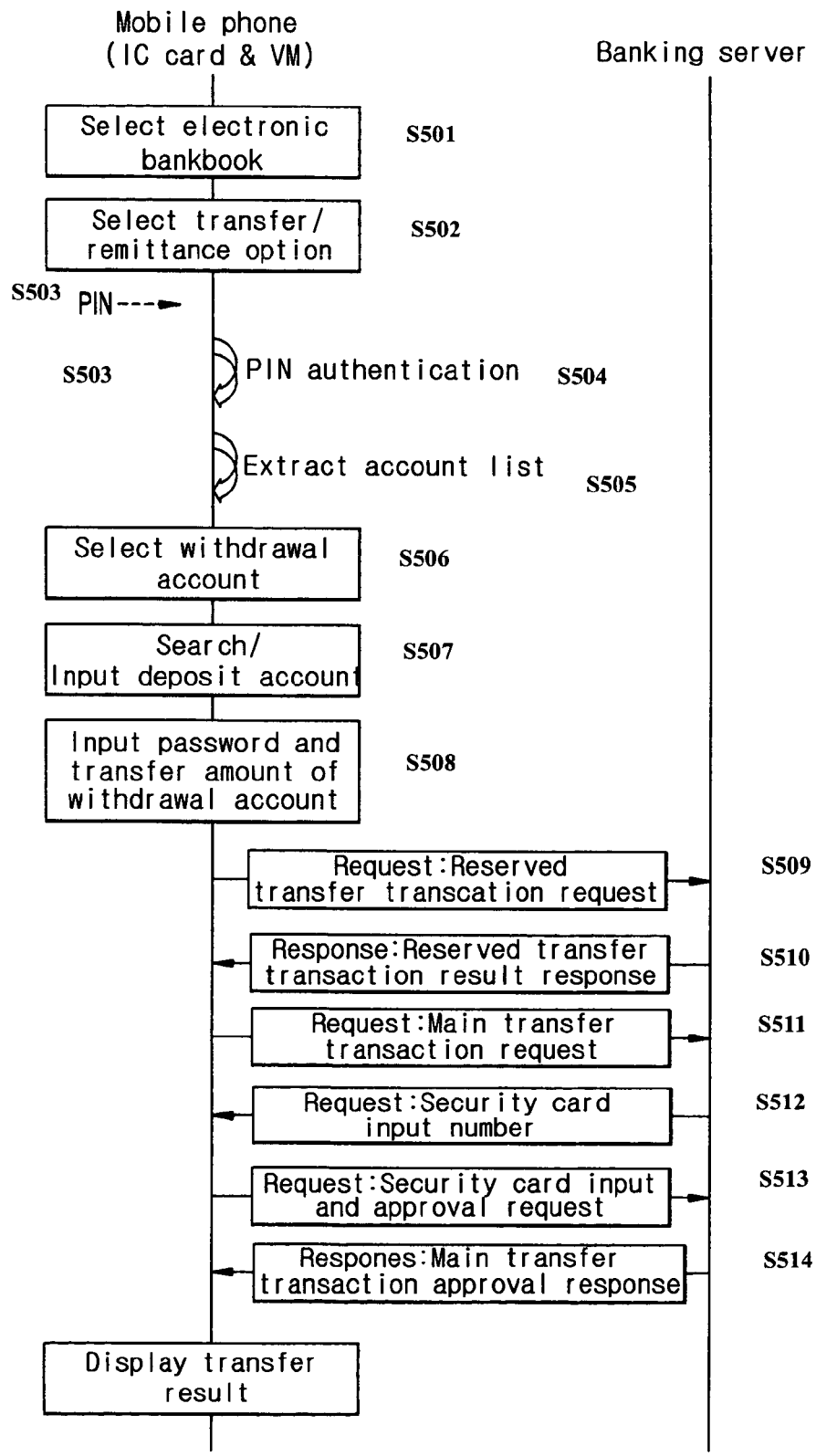
FIG. 5 is a flow diagram showing a mobile transfer/remittance process according to a second embodiment of the present invention.

FIG. 5 is a flow diagram showing a mobile transfer/remittance service according to a second embodiment of the present invention, in which a process of dealing with the mobile transfer/remittance service by interaction between the IC card 11 and the mobile communication system 10 and the banking server 40 is illustrated.

Figure 6:
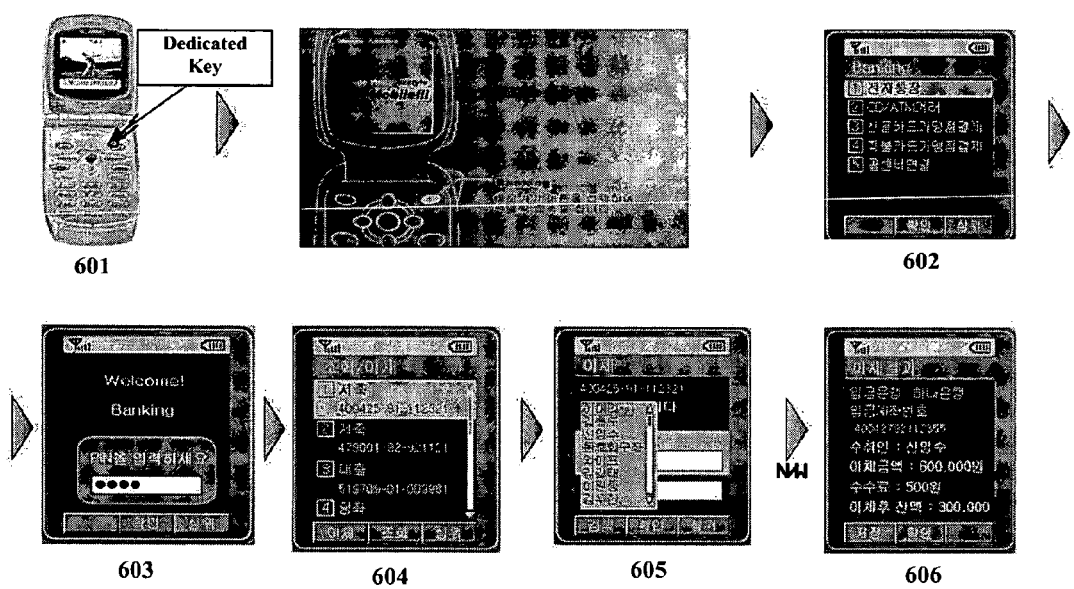
FIG. 6 illustrates user interface screens according to a mobile transfer/remittance service of the present invention.

Referring to FIG. 5, in order to get the mobile transfer/remittance service, an electronic bankbook service is selected S501 through an M/B (mobile banking) dedicated key or a menu option, which is provided to the mobile communication system 10 as illustrated in FIG. 6. Among the options of the electronic bankbook service, any one, namely a transfer/remittance service is selected S502.

Thereby, the transfer/remittance application (or mobile banking application) 12 outputs an input screen with the PIN information to a display window of the mobile communication system 10. Then, when the PIN information is inputted by a user S503, the transfer/remittance application 12 has access to the IC card 11 connected to the mobile communication system 10, reads out the PIN information which has been stored in the IC card 11, compares the inputted PIN information with the read-out PIN information, and authenticates access to the stored data of the IC card 11 S504.

When the inputted and read-out PIN information are matched with each other and a login is completed to the IC card 11, the transfer/remittance application 12 displays financial accounts of the user stored in the IC card 11 in the display window of the mobile communication system 10. When a key signal related to the transfer/remittance of funds is inputted by the selection of the user, a list of the general financial accounts excluding loan accounts is outputted S505. Then, the user selects a withdrawal account from the displayed financial account list S506, so that the user can get services related to the transfer/remittance.

Then, the transfer/remittance application 12 displays the input screen for a deposit account in the display window of the mobile communication system 10, thereby allowing information on the account number of the deposit account as well as information on a financial institution to be inputted by the user. In this case, the user may select and input the deposit account information through a search without directly inputting the information of the deposit account S507. In other words, when the user selects a search option for the deposit account, the transfer/remittance application 12 has access to the IC card 11 to output both a list of the financial accounts categorized as "favorite deposit accounts" and information on their depositors, and also the user may select any one of the financial accounts as the deposit account.

Further, the transfer/remittance application 12 receives information on the password of the withdrawal account selected by the user and information on the amount of transfer. At this point, it is preferable that the password of the withdrawal account is stored in the IC card, but it is checked again to keep security of the withdrawal S508.

When this input and selection process is completed, and then the user requests the transfer/remittance of funds, the transfer/remittance application 12 has socket access to the banking server 40 of the financial institution which keeps the withdrawal account, and establishes a data transmission line.

The transfer/remittance application 12 drafts a reserved transfer transaction request message S509 using information related to the withdrawal and deposit accounts and the amount of transfer/remittance, and requests a reserved transfer transaction from the banking server 40 of the financial institution which keeps the withdrawal account through the data transmission line.

When a response message based on the reserved transfer transaction is normally received S510 from the banking server 40, the transfer/remittance application 12 requests the user to input a password of a security card.

In other words, the transfer/remittance application 12 receives at least one of random numbers ranging from 1 to 35 which are generated by the banking server 40 as a number for the security card, and outputs the received random number to the mobile communication system 10. Then, the user checks the security card to input a password of the security card that corresponds to the security card number through the mobile communication system 10.

Thereby, the transfer/remittance application 12 constructs a main transfer transaction request message S511 with the transaction history and information of the security card, and requests the main transfer transaction from the banking server 40.

When the banking server 40 performs authentication based on the security card S512 & S513, processes the corresponding main transfer transaction, and normally transmits a main transfer transaction response message, the data transmission line between the mobile communication system 10 and the banking server 40 is released, and the transfer/remittance application 12 displays the result of processing the main transfer transaction in the display window S514 of the mobile communication system 10.

In this manner, when the main transfer ends in success, the user can register the deposit account for the transfer of funds in the list of "favorite deposit accounts." Then, this registered information is stored in the IC card 11.

As set forth above, the information related to the deposit/withdrawal accounts is processed by option selection and automatic input without separately inputting it, so that it gives convenience to the user. Further, after carrying out a series of processes such as inputting the deposit/withdrawal accounts for the transfer of funds, inputting the amount of transfer, etc., the mobile communication system 10 has access to the banking server 40. Therefore, it is possible to reduce the time for having access to the banking server 40 and network loads of the communication network.

FIG. 6 sequentially illustrates interface screens, each of which is displayed to the user by the transfer/remittance application 12, according to the second embodiment.

Referring to FIG. 6, the user presses the M/B dedicated key 601 installed on the mobile communication system 10 to activate the electronic bankbook service, and then selects the transfer/remittance service (inquiry/transfer of funds on deposit) from the options of the electronic bankbook service 602.

Thus, the display window of the mobile communication system 10 allows the input screen of the PIN information to be displayed 603. When the PIN authentication is completed with respect to the IC card 11, the list of the deposit accounts of the user stored in the IC card 11 is extracted, and the list of the deposit accounts is displayed in the display window 604 of the mobile communication system 10.

Further, the display window of the mobile communication system 10 is allowed to select the deposit account by outputting either the input screen for the deposit accounts or the list of their depositors through a menu for the account search, and to output the input screen (not shown) for the account password and the transfer amount which the user is able to input.

In this manner, when the deposit/withdrawal accounts are selected and the transfer amount is inputted 605, the network connection and data transmission are performed between the mobile communication system 10 and the banking server 40. Then, the mobile communication system 10 receives the result of processing the transfer/remittance of funds from the banking server 40, and outputs the received result to its display window 606.

Third Embodiment

Figure 7:
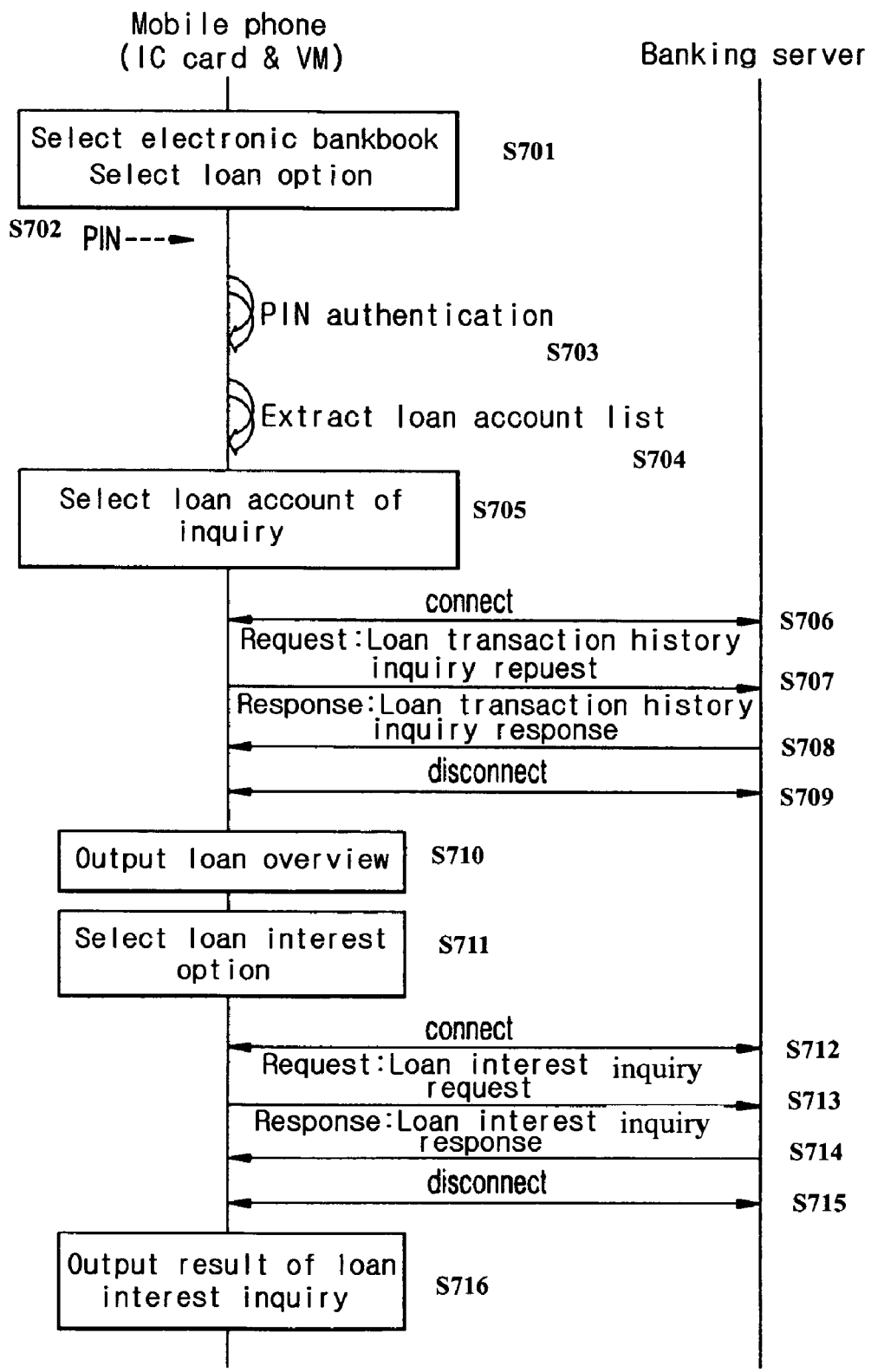
FIG. 7 is a flow diagram showing a mobile loan overview and loan interest inquiry process according to a third embodiment of the present invention.

FIG. 7 is a flow diagram showing a mobile loan overview and loan interest inquiry process according to a third embodiment of the present invention.

FIG. 7 illustrates a process of inquiring of the overview of a loan account of a user and the interest on the loan by communication (interaction) between the IC card 11 and the mobile communication system 10 and the banking server 40.

Referring to FIG. 7, an electronic bankbook service is selected through an M/B (mobile banking) dedicated key or a menu option, which is provided to the mobile communication system 10. Among the options of the electronic bankbook service, any one, namely a loan inquiry/payment service is selected S701.

Thereby, the loan/payment application (or banking application) 12 outputs an input screen of PIN information to a display window of the mobile communication system 10, has access to the IC card 11, reads out the PIN information S702 which has been stored in the IC card 11, compares the PIN information inputted by the user with the stored PIN information, and executes PIN authentication S703 in order to have access to data of the IC card 11.

When the inputted and stored PIN information are matched with each other and a login is completed to the IC card 11, the loan/payment application 12 displays a list of loan accounts of the user stored in the IC card 11 in the display window S704 of the mobile communication system 10.

The user requests the inquiry by selecting S705 the corresponding account intended for inquiry from the list of the loan accounts displayed in the display window of the mobile communication system 10, the loan/payment application 12 has socket access to the banking server 40 of the financial institution S706 which keeps the selected loan account and establishes a data transmission line.

Then, the loan/payment application 12 drafts a transaction history inquiry request S707 message with an account number, a password, etc. of the selected loan account, and requests a loan transaction history inquiry from the banking server 40 through the data transmission line.

In response to the request, the banking server 40 performs a predetermined customer authentication procedure, checks late transaction history data of the corresponding loan account in interaction with its host server, constructs a loan transaction history response message S708, and transmits the constructed loan transaction history response message to the mobile communication system 10.

In this manner, when the loan transaction history of the corresponding loan account is normally received, the data transmission line between the mobile communication system 10 and the banking server 40 is released S709, and the loan/payment application 12 displays a result of the inquiry S710 in the display window of the mobile communication system 10.

At this time, outputs of the inquiry result include an account number of the corresponding loan account, an amount of the loan, a payment history of the loan, which are displayed along with processed month/date/year, an amount of loan repayment, an amount of loan interest, and so forth. After inquiring of this loan overview, the user selects and clicks an option for a loan interest inquiry S711. Then, the mobile communication system 10 has data access to the banking server 40 again S712, constructs a loan interest inquiry request message S713 by account number, password, inquiry term, etc. of the loan account, and transmits the constructed loan interest inquiry request message to the banking server 40.

The banking server 40 checks data related to the loan interest of the corresponding loan account, drafts a loan interest inquiry response message S714, and transmits the drafted loan interest inquiry response message to the mobile communication system 10.

In this manner, when the loan interest inquiry response message is normally received, the data transmission line between the mobile communication system 10 and the banking server 40 is released S715, and the loan/payment application 12 checks the received message, and displays information S716 on the loan interest of the corresponding loan account in the display window of the mobile communication system 10. Here, outputs of the inquiry result may include the account number, the amount of loan balance, the amount of loan repayment, the start and end dates in counting the loan interest, the loan interest, the overdue interest and so forth.

Figure 8:
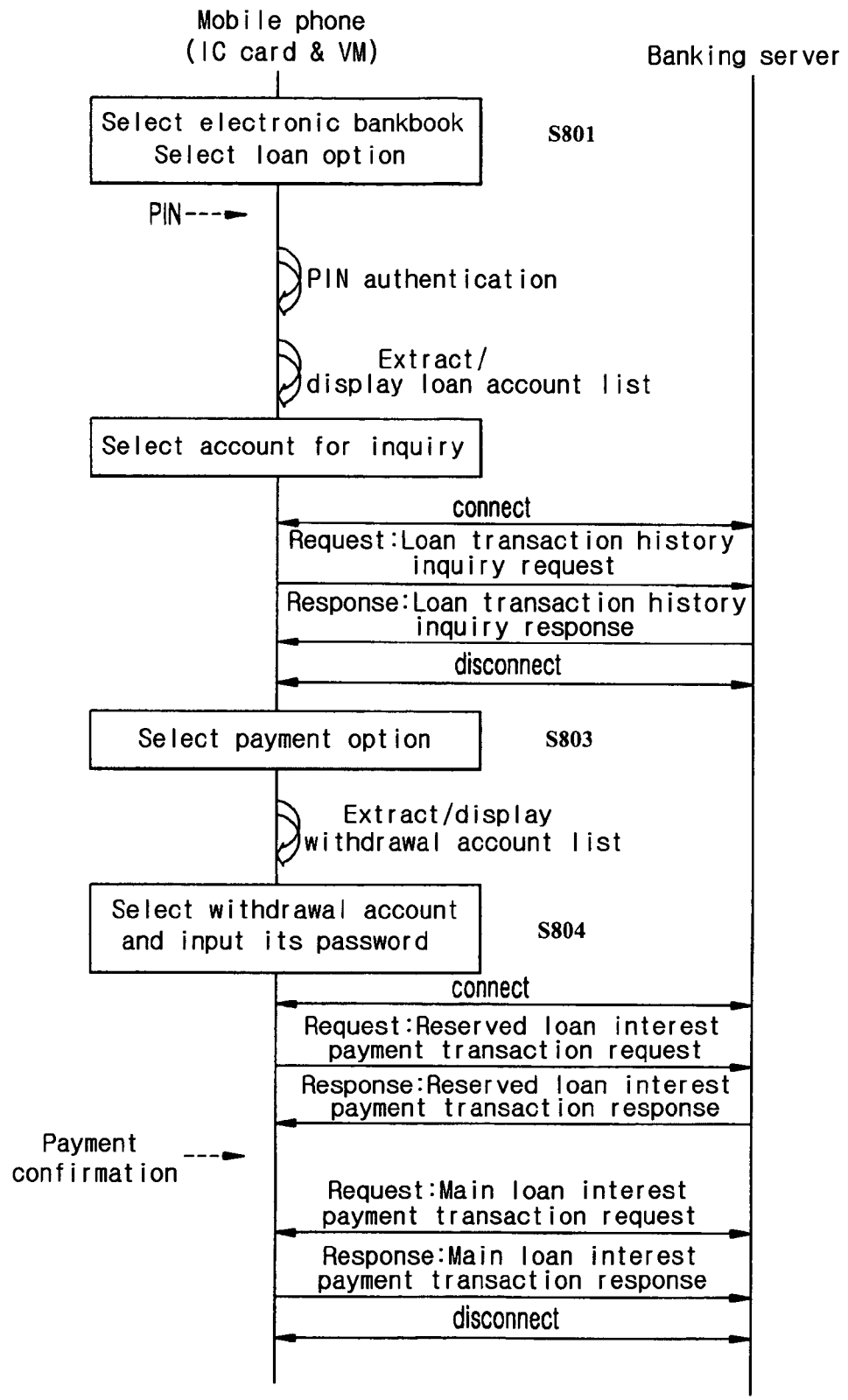
FIG. 8 is a flow diagram showing a loan interest payment process after a mobile loan overview inquiry according to a third embodiment of the present invention.

FIG. 8 is a flow diagram illustrating a process of inquiring of an overview of a loan account of a user at both the mobile communication system 10 and the banking server 40, and a process for paying the loan interest.

FIG. 8 shows a process of selecting electronic bankbook S801 & S802 and loan/payment options to inquire of and output an overview of a specified loan account, which is similar to that set forth in FIG. 7.

In this manner, after the specified loan account is referred to through the mobile communication system 10, a payment item is selected and clicked by the user when the loan interest is intended for payment S803. Then, the loan/payment application 12 has access to the IC card 11 and displays a list of withdrawal accounts among general financial accounts (excluding loan accounts) of the user in the display window of the mobile communication system 10.

Now, the user may select the corresponding withdrawal account from the withdrawal account list displayed in the display window of the mobile communication system 10 and input a password of the corresponding withdrawal account S804. Here, the withdrawal account may be selected either by one stored in the IC card 11 or by direct inputting of the user.

The loan/payment application 12 drafts a reserved loan interest payment transaction request message by information on the loan account and its payment, the withdrawal account and its number, a financial institution which undergoes money withdrawals, and so forth, and establishes a data transmission line with respect to the banking server 40, and then requests a reserved loan interest payment transaction through the data transmission line.

Then, the banking server 40 performs a predetermined customer authentication process in cooperation with the financial institution having the withdrawal account, constructs a reserved loan interest payment transaction response message, and transmits the reserved loan interest payment transaction response message to the mobile communication system 10.

When a reserved loan interest payment transaction history transmitted by the banking server 40 is displayed in the display window of the mobile communication system 10, and then the final "repayment confirmation" is made by the user, the loan/payment application 12 drafts a main loan interest payment transaction request message and transmits it to the banking server 40.

The banking server 40 processes a main loan interest payment transaction history with respect to the loan account and the withdrawal account, and transmits a main loan interest payment transaction response message to the mobile communication system 10.

In this manner, when the main loan interest payment transaction response message is normally received, the loan/payment application 12 releases the data transmission line between the mobile communication system 10 and the banking server 40, and outputs the processed result to the display window of the mobile communication system 10.

Meanwhile, the process of the loan inquiry/interest payment set forth with reference to FIGS. 7 and 8 is generally divided into a process of the loan account overview inquiry, a process of the loan interest inquiry, and a process of the loan interest payment, all of which may be performed separately or continuously to any other processes. In other words, the user can select the loan account and the withdrawal account immediately without separately inquiring of the loan account and the loan interest, and deal with payment of the loan interest (or principal). Further, the user can inquires of the overview of the loan and details of the loan interest, and pay the loan interest and/or principal.

As set forth above, according to the present invention, when the user makes use of the banking services by use of this mobile communication system, the procedure of inputting the account number and ID (PIN)/password through the mobile communication system each time is omitted, because a removable IC card and a banking application driven on the Java VM are used. Therefore, it is possible to facilitate banking of the user.

Further, according to the present invention, various kinds of mobile banking or authentication are processed before a mobile communication system has access to a banking server. Thus, it is possible to minimize the access time between the mobile communication system and the banking server, and thus, to reduce communication charges of the user, and to minimize network loads of the communication network.

Moreover, it is possible to reinforce security of data and financial information under the mobile environment by the PIN authentication with the removable IC card or any other security modules.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for providing banking services that uses a mobile communication system, in which at least one financial transaction of at least one financial institution is processed by a mobile communication system, the system comprising:
   a mobile communication system, having an integrated circuit (IC) card and a memory upon which a banking application is installed, the memory mounting all software for mobile banking services, the mobile communication system being configured to transmit and receive data via a wireless connection, the IC card storing personal identification number (PIN) information and information related to at least one financial account, the banking application processing the financial transaction by mobile banking; and
   at least one banking server that only provides information for processing a request to process the at least one financial transaction and for processing a response to the request when the at least one banking server is requested to process the financial transaction by the banking application of the mobile communication system,
   wherein the at least one financial transaction is calculated by the mobile communication system and is transmitted by the mobile communication system to the at least one banking server,
   wherein, when a key signal related to the at least one financial transaction is inputted via the mobile communication system, the banking application installed on the memory of the mobile communication system is executed, the PIN information for completing a login to the IC card is inputted, authentication is performed by the mobile communication system, a list of the at least one financial account stored on the IC card is extracted and displayed in a display window of the mobile communication system, at least one account is selected from the list of the at least one financial account, a request message for the financial transaction is formed using information related to the selected at least one account and transmitted to the at least one banking server, the at least one banking server processing the at least one financial transaction in response to the request message for the at least one financial transaction and transmitting a result of processing the at least one financial transaction to the mobile communication system, and the result of processing the at least one financial transaction is displayed on the display window of the mobile communication system,
   wherein the IC card resets the information related to the selected at least one account stored on the IC card to synchronize the information related to the selected at least one account with information managed by the at least one banking server,
   wherein the information related to the selected at least one account stored on the IC card is synchronized via the wireless connection, and
   wherein the IC card is not in physical contact with the at least one banking server.

2. The system set forth in claim 1, further comprising: a dedicated key for performing the at least one financial transaction.

3. The system set forth in claim 1, wherein the mobile communication system is anyone of a mobile phone, a smart phone and a personal digital assistant (PDA) which have a communication function, and
   wherein a hierarchical structure of software stored on the mobile communication system comprises an IC card driver for managing data stored on the IC card and system software for managing basic functions of the mobile communication system, which are established as a part of a lower structure, the banking application and an IC card application programming interface (IC card API), which are established as a part of an upper structure, and a Java virtual machine (Java VM), which is established as an intermediate code for executing the banking application between the lower and upper structures.

4. The system set forth in claim 1, wherein the IC card is removable from the mobile communication system.

5. The system set forth in claim 3, wherein the IC card is removable from the mobile communication system.

6. The system set forth in claim 1, wherein the IC card performs at least one of modifying the information related to the at least one financial account stored on the IC card, and adding new information related to the at least one financial account, upon permitting a login through authentication of the PIN information.

7. The system set forth in claim 3, wherein the IC card performs at least one of modifying the information related to the at least one financial accounts stored on the IC card, and adding new information related to the at least one financial account, upon permitting a login through authentication of the PIN information.

8. The system set forth in claim 1, wherein the information related to the at least one financial account includes an account number and a password, a corresponding financial institution code, information describing a type of financial account, and customer information for each financial account for a user.

9. The system set forth in claim 3, wherein the IC card stores the information related to the at least one financial account comprising an account number and a password, a corresponding financial institution code, information describing a type of financial account, and customer information for each financial account for a user.

10. The system set forth in claim 1, wherein the PIN information stored on the IC card is inputted by providing a short message service (SMS) message to the mobile communication system of a user, and by manipulating the IC card.

11. The system set forth in claim 3, wherein the PIN information stored on the IC card is inputted by providing a short message service (SMS) message to the mobile communication system of a user, and by manipulating the IC card.

12. The system set forth in claim 3, wherein the mobile communication system and the banking server communicate using at least one of encryption solutions including E2E (end to end) and WPKI (wireless public key infrastructure) to secure transmissions of data and financial information.

13. The system set forth in claim 1, wherein the at least one financial transaction comprises at least one of a financial account inquiry, a transfer and remittance, a loan repayment, and a loan interest repayment.

14. An apparatus for facilitating banking transactions, the apparatus comprising:

at least one processor that extracts financial account information stored on an integrated circuit card in a mobile communication system upon authenticating a user, the at least one processor having a memory mounting all software for mobile banking services, wherein the user is authenticated by comparing a personal identification number entered by the user with a pre-stored personal identification number, the pre-stored personal identification number being stored on the integrated circuit card, wherein the financial account information comprises: at least one account identifier identifying at least one financial account, an account password, a financial institution code, an account type, and customer information corresponding to the at least one financial account, wherein the financial account information stored on the IC card is synchronized via a wireless connection with at least one banking server that only provides and receives information, at least one financial transaction being calculated by the processor and is transmitted by the apparatus to the at least one banking server, and wherein the IC card is not in physical contact with the at least banking server.

15. A method for facilitating banking transactions, the method comprising:

selecting information for at least one financial account for which information is stored on an integrated circuit card of a mobile communications apparatus, upon authenticating a user, the mobile communications apparatus having a memory mounting all software for mobile banking services, wherein the integrated circuit card resets information for the at least one financial account so as to synchronize the information for the at least one financial account with information managed by at least one banking server that is located remotely from the mobile communications apparatus, wherein the information for the at least one financial account is stored on the IC card and is synchronized with the information managed by the at least one banking server via a wireless connection, at least one financial transaction being calculated by the mobile communications apparatus and is transmitted by the mobile communications apparatus to the at least one banking server, and wherein the IC card is not in physical contact with the at least one banking server.

16. The system set forth in claim 1, wherein the at least one financial transaction is an account inquiry where the accounts of the user are stored on the IC card, and an account inquiry application is stored in the memory of the mobile communication system that processes the financial transaction.

17. The system set forth in claim 1, wherein the at least one financial transaction is a transfer/remittance where the accounts of the user are stored on the IC card, and a transfer/remittance application is stored in the memory of the mobile communication system that processes the financial transaction.

18. The system set forth in claim 1, wherein the at least one financial transaction is a loan/payment where the accounts of the user are stored on the IC card, and a loan/payment application is stored in the memory of the mobile communication system that processes the financial transaction.

19. The apparatus set forth in claim 14, wherein the at least one financial transaction is an account inquiry, a transfer/remittance or a loan/payment, where the accounts of the user are stored on the IC card, and at least one of an account inquiry application, a transfer/remittance application or a loan/payment application in the memory of the mobile communication system that processes the financial transaction.

20. The method set forth in claim 15, wherein the at least one financial transaction is an account inquiry, a transfer/remittance or a loan/payment, where the accounts of the user are stored on the IC card, and at least one of an account inquiry application, a transfer/remittance application or a loan/payment application in the memory of the mobile communication apparatus that processes the financial transaction.

* * * * *